3,074,894
Patented Jan. 22, 1963

3,074,894
PREPARATION OF CELLULAR POLYURETHANES
Günther Loew, Köln, Wilhelm Thoma, Leichlingen, and Hermann Bernhard, Köln-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Sept. 10, 1957, Ser. No. 683,016
Claims priority, application Germany Sept. 13, 1956
14 Claims. (Cl. 260—2.5)

This invention relates generally to the manufacture of polyurethanes and, more particularly, to a novel method for making cellular polyurethanes having improved physical characteristics.

It has been proposed heretofore to manufacture a cellular polyurethane plastic by a process wherein an organic compound having at least two reactive hydrogen atoms and capable of forming polyurethanes is reacted with an organic polyisocyanate. If the organic compound having the reactive hydrogen atoms has a comparatively large number of carboxyl groups, a cellular product is obtained usually by reacting just these two components together. If the organic compound having reactive hydrogen atoms has terminal hydroxyl groups, it is usually necessary to add water to the mixture to produce a cellular polyurethane plastic. The water reacts with the NCO groups to form carbon dioxide which becomes entrapped in the viscous reaction mixture and forms cells or pores in the resulting solidified polyurethane plastic.

Hoppe et al., in U.S. 2,764,565, disclose one process which is particularly advantageous for making cellular polyurethanes. This patent discloses a method for mixing together the components of a reaction mixture which forms a polyurethane. The more resilient cellular polyurethanes made in accordance with the heretofore available processes having a density of about 35 kilograms per cubic meter have a compression hardness of from about 40 grams per square centimeter to about 80 grams per square centimeter at about 40% compression. Cellular polyurethanes having a resiliency within this range are useful for a large number of purposes, but a softer cellular polyurethane having a lower compression hardness at this density is desirable for some purposes, such as, for example, for making cushions or other articles of upholstery or for sponges useful in applying cosmetics or for making bandages.

It is therefore an object of this invention to provide a method for making cellular polyurethane plastics having improved physical characteristics. Another object of the invention is to provide a method for making cellular polyurethane plastics having a hardness less than about 40 grams per square centimeter at 40% compression. Still another object of the invention is to provide a method for making cellular polyurethane plastics particularly advantageous for making cushions, sponges, bandages and the like.

The foregoing objects as well as others are accomplished in accordance with this invention, generally speaking, by providing a method for making a cellular polyurethane plastic wherein the reaction mixture which produces the cellular polyurethane plastic contains a compound which produces cleavage products capable of reacting with NCO groups during the chemical reaction between the components which produce the cellular polyurethane. In other words, the process contemplated by this invention involves including in the reaction mixture capable of forming a polyurethane any compound which, under the reaction conditions, forms a cleavage product which will react with NCO groups present in the reaction mixture. More specifically, the invention contemplates a process wherein a cellular polyurethane plastic is produced from a reaction mixture containing an organic polyisocyanate, an organic compound having at least two reactive hydrogen atoms and capable of reacting with the organic polyisocyanate to form a polyurethane plastic and a compound which breaks down during the chemical reaction between the organic polyisocyanate and compound capable of reacting therewith to form a polyurethane into a compound having reactive hydrogen atoms which will react with the NCO groups of the polyisocyanate.

Any suitable compound which will not react with the NCO groups of an organic polyisocyanate under the conditions at which it is mixed with the reaction mixture which is to react to form a cellular polyurethane but which, during the reaction between the components of the reaction mixture will break down or otherwise form compounds having reactive hydrogen atoms capable of reacting with NCO groups of an organic polyisocyanate, may be used. Examples of such compounds include organic carbonates, pyrocarbonates and orthocarbonates. More specifically, any suitable alkyl pyrocarbonate, such as dimethyl pyrocarbonate or diethyl pyrocarbonate, or any carbonate, such as, for example, dimethyl carbonate, diethyl carbonate, glycol carbonate or ethyl carbonate or methyl orthocarbonate, may be used. Moreover, any suitable acetal which, under the reaction conditions existing during the formation of the cellular polyurethane, forms a compound having reactive hydrogen atoms capable of reacting with NCO groups may be used. Examples of such compounds include acetaldehyde dialkyl acetal, malonic aldehyde tetra alkyl acetal. The formals and ketals, such as, for example, acetone dialkyl ketal, are also examples of suitable compounds. The term "alkyl" is meant to designate any lower alkyl radical with 1–5 carbon atoms, such as the methyl, ethyl, propyl, isopropyl radicals or the like. It is, however, sometimes possible to employ acetals, ketals, carbonates etc. with alkyl radicals having more than 5 carbon atoms. Other suitable compounds include the orthocarboxylates, such as, for example, ethyl orthoformate, and acylimino alkyl ethers, such as acetimino ethyl ether. Each of these compounds decomposes under the reaction conditions employed in making a cellular polyurethane from an organic polyisocyanate and a compound capable of reacting therewith to form a polyurethane. The cleavage products obtained from the decomposition include alcohols and amines, which have reactive hydrogen atoms capable of reacting with NCO groups. The decomposition of the compound which produces cleavage products during the reaction which produces the polyurethane may be caused by the temperature of the reaction mixture, hydrolysis caused by water present in the reaction mixture, the presence of an activator or catalyst in the reaction mixture, to a combination of these factors or to other factors. The exact chemistry involved has not been finally ascertained, but it is known that a reaction mixture containing one of the compounds of the class disclosed herein along with the conventional components of a cellular polyurethane plastic produces a cellular plastic having improved physical characteristics. The compounds, when they decompose, can also produce inert gases, such as carbon dioxide or nitrogen, but these materials do not produce any detrimental effects on the chemical reaction or the cellular product.

The manipulative steps involved in preparing a cellular polyurethane in accordance with this invention are essentially the same as those employed in the heretofore available processes. The components may be mixed together in the apparatus disclosed by Hoppe et al. in U.S. 2,764,565 or in any other apparatus suitable for rapidly mixing the components together. The compound which produces the cleavage product may be added separately to the reaction mixture or it may be first admixed with the activator mixture, the organic compound having reactive hydrogen atoms or with any one of the other components of the polyurethane plastic before it is introduced into the reaction mixture which produces the polyurethane.

Any suitable organic compound having at least two reactive hydrogen atoms capable of reacting with an organic polyisocyanate to form urethane groups may be used. Examples of such compounds include hydroxy-terminated polyesters prepared by esterification of a polyhydric alcohol and a polycarboxylic acid, a polyalkylene ether glycol prepared by thermal condensation of an alkylene oxide, such as propylene oxide, ethylene oxide or the like, or by the condensation of an alkylene oxide with a glycol or a polyhydric alcohol having more than two hydroxyl groups, a polyester amide, a polythioether prepared by condensation of a thioglycol or the like, the hydrogenation product of carbon monoxide-ethylene mixed polymers or the like. These organic compounds having reactive hydrogen atoms should preferably have a molecular weight of at least about 500 and, if substantially linear, an hydroxyl number of not more than about 224 is preferred. The polyester should preferably have an acid number of zero or not more than 2.

Any suitable organic polyisocyanate which will react with the organic compound having at least two reactive hydrogen atoms to produce a polyurethane, such as, for example, 2,4-toluylene diisocyanate, 2,6-toluylene diisocyanate, 1,4-phenylene diisocyanate, 1,5-naphthylene diisocyanate, diphenylmethane - 4,4' - diisocyanate, dimethyldiphenyl-4,4'-diisocyanate, and the like may be used.

It is preferred to use from about 0.5 to about 1.5 mols of the organic polyisocyanate for each 17 grams OH groups present in the organic compound having reactive hydrogen atoms. From about 0.5% to about 10% water is preferably used in the reaction mixture as a cross-linker and an emulsifier may be included, if desired, for some purposes in an amount of from about 0.5 to about 10%, based on the weight of reaction mixture. Any compatible emulsifier, such as those disclosed in the aforesaid Hoppe et al. patent, may be used. The reaction mixture should preferably include from about 0.1% to about 4% of a suitable accelerator or catalyst. Any suitable catalyst including those disclosed in the aforesaid Hoppe et al. patent, such as, for example, a suitable tertiary amine, may be used.

The amount of compound capable of forming cleavage products containing reactive hydrogen atoms which will react with NCO groups under the reaction conditions employed in making the cellular polyurethane will vary depending upon the softness desired and upon the other characteristics desired in the product. The invention thus contemplates using these compounds in any suitable quantity, but usually from about 0.1% to about 20% by weight of the reaction mixture will be one of these compounds. Preferably, the reaction mixture will contain from about 1% to about 3% by weight of the compound which will decompose or otherwise form a cleavage compound capable of reacting with an NCO group.

The process provided by this invention makes it possible to prepare foams not only of improved softness but also of improved density. It is possible in accordance with this invention to produce cellular polyurethanes having a lower density than those produced heretofore from a given reaction mixture. The alkyl pyrocarbonates are particularly effective in producing a cellular polyurethane of relatively low density, so these compounds are preferred for making cellular polyurethanes when a low density product is desired. In fact, the product obtained when an alkyl pyrocarbonate is used is not only relatively light in weight, but is also very soft and particularly advantageous for making some articles, such as sponges.

In order better to describe and further clarify the invention, the folowing are specific examples thereof:

*Example 1*

A. Cellular plastics containing urethane groups are prepared by employing the usual manipulative steps in which about 100 parts by weight of a polyester prepared by esterification of about 16 mols adipic acid, about 16 mols diethylene glycol, and about 1 mol trimethylolpropane are mixed with about 37.8 parts 2,4-toluylene diisocyanate and about 9 parts activator mixture. The activator mixture contains about 3 parts adipic acid ester of N-diethylethanol amine, about 2 parts dialkyl ammonium oleate, about 1 part sulfonated castor oil, about 2.8 parts water and about 0.2 part paraffin oil. These components are mixed together in any suitable device and by any suitable process, such as disclosed by Hoppe et al. in the aforesaid patent. Substantially immediately after mixing, the components react chemically and the reaction mixture expands and solidifies into a cellular polyurethane plastic.

B. Another cellular polyurethane plastic is prepared by mixing about 100 parts by weight polyester prepared from the same components as the polyester described above with about 37.5 parts of 2,4-toluylene diisocyanate and about 7.3 parts of an activator mixture. This activator mixture contains about 0.5 part permethylated diethylene triamine, about 1.5 parts diethyl ammonium oleate, about 0.5 part sulfonated castor oil, about 4.5 parts water and 0.3 part paraffin oil. These components are mixed together in accordance with the same process as above and a cellular polyurethane plastic is formed.

C. About 100 parts by weight polyester having the composition described above are mixed with about 45.5 parts 2,4-toluylene diisocyanate and about 6.9 parts activator mixture. The activator mixture contains about 0.5 part permethylated diethylene triamine, about 1.5 parts diethyl ammonium oleate, about 1 part sulfonated castor oil, about 3.4 parts water and about 0.5 part paraffin oil. These components are mixed together in accordance with the process of the foregoing embodiments and a cellular polyurethane plastic is produced.

D. About 100 parts polyester having the composition described above are mixed with about 38.3 parts 2,4-toluylene diisocyanate and about 7.2 parts of an activator mixture containing about 1.2 parts dimethyl benzyl amine, about 1.5 parts diethyl ammonium oleate, about 2 parts sulfonated castor oil, about 2.2 parts water and about 0.3 part paraffin oil. These components are mixed together in accordance with the process described above.

A cellular polyurethane plastic is prepared from each of the foregoing reaction mixtures except that about 2 parts diethyl pyrocarbonate are added to the reaction mixtures of paragraphs A and B. About 5 parts malonic dialdehyde-tetraalkyl acetal are added to the reaction mixture in paragraph C and about 2.3 parts acetimino ethyl ether are added to the reaction mixture of paragraph D. The physical characteristics of the two cellular plastics formed with and without the compound which decomposes to form a cleavage product are compared in the following table:

| Cellular Polyurethane | Percent Elongation at Break | Compression Hardness, grams/sq. cm. |
| --- | --- | --- |
| A. Without addition of any compound which produces cleavage products | 118 | 75 |
| With addition of diethyl pyrocarbonate | 152 | 30 |
| B. Without addition of any compound which produces cleavage products | 204 | 40 |
| With addition of diethyl pyrocarbonate | 310 | 17 |
| C. Without addition of any compound which produces cleavage products | 120 | 55 |
| With addition of malonic dialdehyde-tetraethyl acetal | 166 | 40 |
| D. Without addition of any compound which produces cleavage products | 184 | 61 |
| With addition of acetimino ethyl ether | 319 | 39 |

In the foregoing table the compression hardness was determined at 40% compression.

*Example 2*

About 100 parts by weight of a polyester prepared by esterification of about 16 mols adipic acid, about 16 mols diethylene glycol, and about 1 mol trimethylol propane are mixed with about 54 parts 2,4-toluylene diisocyanate and about 10 parts of an activator mixture containing about 3 parts bis-(N-diethyl ethanol amine)adipate, about 2 parts diethyl ammonium oleate, about 1 part sulfonated castor oil, about 2.8 parts water, about 0.2 part paraffin oil and about 10 parts diethyl carbonate. Upon mixing of these components together, chemical reaction occurs and the reaction mixture expands and solidifies into a cellular polyurethane plastic which is capable of absorbing substantially more water than a cellular polyurethane plastic prepared from the same reaction mixture with the exception that it does not contain any compound which will form cleavage products during the chemical reaction which will react with an NCO group.

*Example 3*

About 100 parts by weight of a polyester prepared by esterification of about 16 mols adipic acid, about 16 mols diethylene glycol and about 1 mol trimethylol propane are mixed with about 48.5 parts 2,4-toluylene diisocyanate and about 7.5 parts of an activator mixture containing about 1 part diethylamino ethyl morpholine, about 1 part diethyl ammonium oleate, about 2 parts sulfonated castor oil, about 3 parts water, about 0.5 part paraffin oil and about 4.5 parts dimethyl pyrocarbonate. Upon mixing the components together, chemical reaction begins and a cellular polyurethane plastic having a density of about 26 kilograms per cubic meter is obtained. A cellular polyurethane plastic prepared from exactly the same reaction mixture with the exception that it does not contain dimethyl pyrocarbonate or any other compound which forms cleavage products which will react with an NCO group during the chemical reaction has a density of about 35 kilograms per cubic meter.

*Example 4*

About 100 parts by weight of a polythioether prepared by the thermal condensation of a thiodiglycol and butane dioxyethyl glycol are mixed with about 38.5 parts 2,4-toluylene diisocyanate and about 7.5 parts of an activator mixture containing about 1.2 parts dimethyl benzyl amine, about 1.5 parts diethyl ammonium oleate, about 2 parts sulfonated castor oil, about 2.5 parts water, about 0.3 part paraffin oil and about 2 parts diethyl pyrocarbonate. Upon mixing the components together, a cellular polyurethane plastic is produced which has a lower density and is softer than the cellular polyurethane plastic prepared from a reaction mixture having the same composition as that above with the exception that it does not contain any diethyl pyrocarbonate or other compound which will decompose during the chemical reaction which produces the cellular polyurethane to form a cleavage product which will react with NCO groups.

It is to be understood that any other suitable organic compound having reactive hydrogen atoms may be substituted in the foregoing examples for the polyester or polythioether described therein. Moreover, any other suitable polyisocyanate may be substituted for the toluylene diisocyanate. Likewise, any other suitable activator mixture may be substituted for the ones described in the examples. In fact, in some cases the activator mixture may be eliminated and only water may be added in lieu thereof. Any other suitable compound which decomposes during the chemical reaction which results in the cellular polyurethane plastic to produce a cleavage product having reactive hydrogen atoms which will react with an NCO group may be substituted for those used in the foregoing examples to produce the same type of improvement in physical characteristics in the resulting product.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. In the manufacture of a cellular polyurethane by a process comprising reacting an organic polyisocyanate and an organic compound having at least two reactive hydrogen atoms, a molecular weight of at least about 500, an hydroxyl number of more than about 224 and an acid number of not more than about 2, said organic compound being reactive with said polyisocyanate to form a polyurethane, the improvement which comprises reacting the components together in a reaction mixture containing from about 0.1% to about 20% by weight of an alkyl pyrocarbonate.

2. In the manufacture of a cellular polyurethane by a process comprising reacting an organic polyisocyanate and an organic compound having at least two reactive hydrogen atoms, a molecular weight of at least about 500, an hydroxyl number of more than about 224 and an acid number of not more than about 2, said organic compound being reactive with said polyisocyanate to form a polyurethane, the improvement which comprises reacting the components together in a reaction mixture containing from about 0.1% to about 20% by weight of an alkyl orthocarbonate.

3. In the manufacture of a cellular polyurethane by a process comprising reacting an organic polyisocyanate and an organic compound having at least two reactive hydrogen atoms, a molecular weight of at least about 500, an hydroxyl number of more than about 224 and an acid number of not more than about 2, said organic compound being reactive with said polyisocyanate to form a polyurethane, the improvement which comprises reacting the components together in a reaction mixture containing from about 0.1% to about 20% by weight of an acetaldehyde dialkyl acetal.

4. In the manufacture of a cellular polyurethane by a process comprising reacting an organic polyisocyanate and an organic compound having at least two reactive hydrogen atoms, a molecular weight of at least about 500, an hydroxyl number of more than about 224 and an acid number of not more than about 2, said organic compound being reactive with said polyisocyanate to form a polyurethane, the improvement which comprises reacting the components together in a reaction mixture containing from about 0.1% to about 20% by weight of an acetone dialkyl ketal.

5. In the manufacture of a cellular polyurethane by a process which comprises reacting an organic polyisocyanate and an organic compound having at least two reactive hydrogen atoms, a molecular weight of at least about 500, an hydroxyl number of not more than about 224 and an acid number of not more than 2, said organic compound being reactive with said polyisocyanate to form a polyurethane, the improvement which comprises reacting the said components together while in admixture with about 0.1 percent to about 20 percent by weight of a member selected from the group consisting of a dialkyl carbonate, a dialkyl pyrocarbonate, an alkyl orthocarbonate, an acetaldehyde dialkyl acetal, a malonic aldehyde tetraalkyl acetal, an acetone dialkyl ketal, ethyl orthoformate and acetimino ethyl ether.

6. In the manufacture of a cellular polyurethane by a process which comprises reacting an organic polyisocyanate and a member selected from the group consisting of a polyester prepared by esterification of a polyhydric alcohol and a polycarboxylic acid and having an acid number of not more than about 2, a polyalkylene ether glycol and a polythioether glycol, said group member having a molecular weight of at least about 500 and an hydroxyl number of not more than about 224, the improvement which comprises reacting the said components together while in admixture with about 0.1 percent to about 20 percent by weight of a member selected from the group consisting of a dialkyl carbonate, a dialkyl pyrocarbonate, an alkyl orthocarbonate, an acetaldehyde dialkyl acetal, a malonic aldehyde tetraalkyl acetal, an acetone dialkyl ketal, ethyl orthoformate and acetimino ethyl ether.

7. The process of claim 6 wherein the last said group member is a dialkyl carbonate.

8. The process of claim 6 wherein the last said group member is a dialkyl pyrocarbonate.

9. The process of claim 6 wherein the last said group member is an alkyl orthocarbonate.

10. A method for making a cellular polyurethane having a hardness less than about 40 grams per sq. centimeter at 40 percent compression which comprises reacting a polyester prepared by esterification of a polyhydric alcohol and a polycarboxylic acid, said polyester having an acid number of not more than about 2, an hydroxyl number of not more than about 224 and a molecular weight of at least about 500, and an organic polyisocyanate while said components are in admixture with from about 0.1 percent to about 20 percent by weight of a member selected from the group consisting of a dialkyl carbonate, a dialkyl pyrocarbonate, an alkyl orthocarbonate, an acetaldehyde dialkyl acetal, a malonic aldehyde tetraalkyl acetal, an acetone dialkyl ketal, ethyl orthoformate and acetimino ethyl ether.

11. A method for making a cellular polyurethane which comprises reacting toluylene diisocyanate with a polyester prepared by esterification of adipic acid, diethylene glycol and trimethylolpropane, said polyester having a molecular weight of at least about 500, an hydroxyl number of not more than about 224 and an acid number of not more than about 2 while the said components are in admixture with from about 0.1 percent to about 20 percent by weight diethyl pyrocarbonate.

12. A method for making a cellular polyurethane which comprises reacting toluylene diisocyanate with a polyester prepared by esterification of adipic acid, diethylene glycol and trimethylolpropane, said polyester having a molecular weight of at least about 500, an hydroxyl number of not more than about 224 and an acid number of not more than about 2 while the said components are in admixture with from about 0.1 percent to about 20 percent by weight malonic dialdehyde tetraethyl acetal.

13. A method for making a cellular polyurethane which comprises reacting toluylene diisocyanate with a polyester prepared by esterification of adipic acid, diethylene glycol and trimethylolpropane, said polyester having a molecular weight of at least about 500, an hydroxyl number of not more than about 224 and an acid number of not more than about 2 while the said components are in admixture with from about 0.1 percent to about 20 percent by weight acetimino ethyl ether.

14. A method for making a cellular polyurethane which comprises reacting toluylene diisocyanate with a polyester prepared by esterification of adipic acid, diethylene glycol and trimethylolpropane, said polyester having a molecular weight of at least about 500, an hydroxyl number of not more than about 224 and an acid number of not more than about 2 while the said components are in admixture with from about 0.1 percent to about 20 percent by weight diethyl carbonate.

References Cited in the file of this patent

UNITED STATES PATENTS

| | | |
|---|---|---|
| 2,779,689 | Reis | Jan. 29, 1957 |
| 2,780,350 | Simon et al. | Feb. 5, 1957 |
| 2,863,854 | Wilson | Dec. 9, 1958 |
| 2,932,621 | Terry | Apr. 12, 1960 |

OTHER REFERENCES

Bayer Office of Technical Services; PB 45246, page 5, January 31, 1947.

UNITED STATES PATENT OFFICE
CERTIFICATE OF CORRECTION

Patent No. 3,074,894　　　　　　　　　　　　January 22, 1963

Günther Loew et al.

It is hereby certified that error appears in the above numbered patent requiring correction and that the said Letters Patent should read as corrected below.

Column 6, lines 12, 23, 34 and 44, after "of", each occurrence, insert -- not --.

Signed and sealed this 28th day of April 1964.

(SEAL)
Attest:
ERNEST W. SWIDER

Attesting Officer

EDWARD J. BRENNER
Commissioner of Patents